Nov. 25, 1924. 1,517,145
J. V. BARKER
HEADLIGHT CONTROL DEVICE
Filed Sept. 17, 1923 2 Sheets-Sheet 1
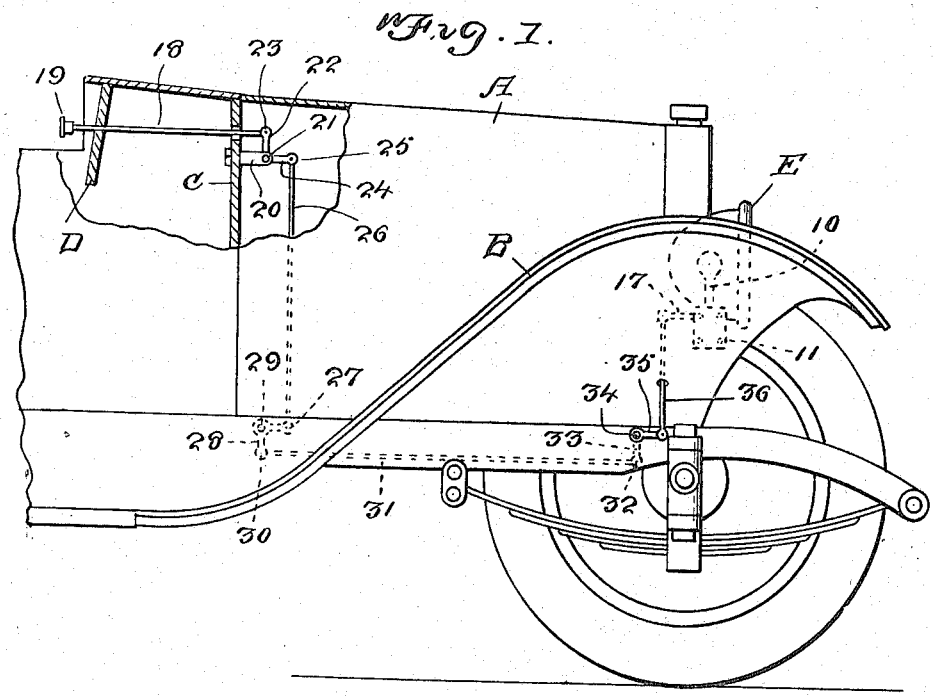
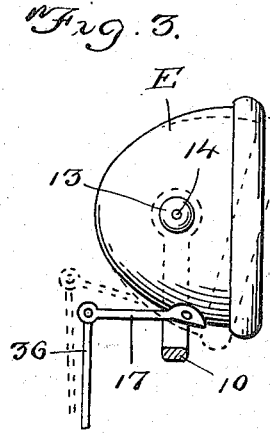
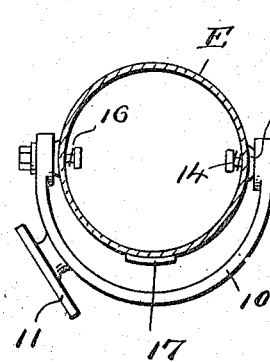
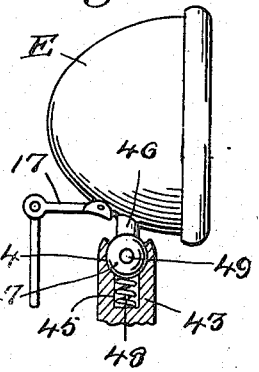
J. V. Barker
INVENTOR Nov. 25, 1924.
J. V. BARKER
1,517,145
HEADLIGHT CONTROL DEVICE
Filed Sept. 17, 1923    2 Sheets-Sheet 2
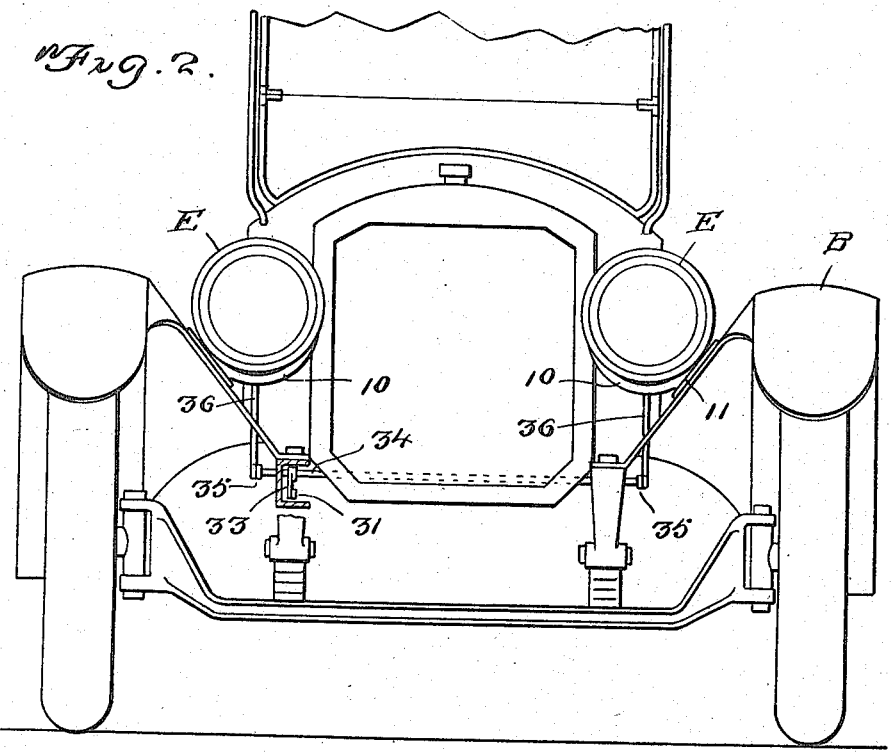
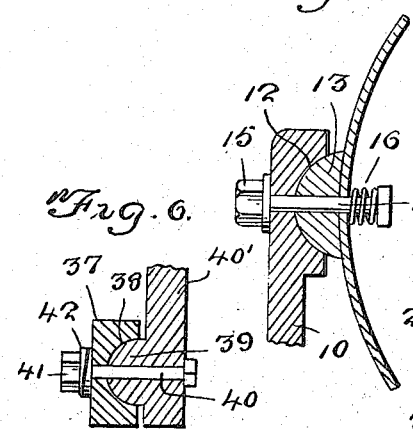
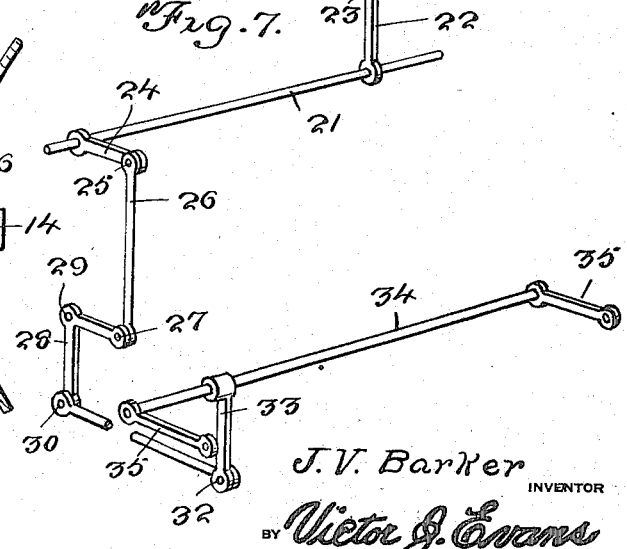

Patented Nov. 25, 1924.

1,517,145

UNITED STATES PATENT OFFICE.

JAMES VIRGIL BARKER, OF HERSMAN, ILLINOIS.

HEADLIGHT CONTROL DEVICE.

Application filed September 17, 1923. Serial No. 663,263.

*To all whom it may concern:*

Be it known that I, JAMES VIRGIL BARKER, a citizen of the United States, residing at Hersman, in the county of Brown and State of Illinois, have invented new and useful Improvements in Headlight Control Devices, of which the following is a specification.

This invention relates to attachments for use upon automobiles and has for its object the provision of a novel mounting and operating means for the headlamps whereby they may be tilted downwardly when approaching other vehicles to avoid blinding the drivers thereof, or to avoid too bright an illumination when passing through certains towns where there are strict regulations concerning the brilliance of headlights.

An important and more specific object is the provision of a mounting for the lamps which will permit them to be tilted by a manual control member operated on the dash or at some other suitable location.

Still another object is the provision of means for preventing the lamps from working loose and rattling.

An additional object is the provision of a structure of this character which will be simple and inexpensive in manufacture, easy to install and operate, positive in action, efficient and durable in service, and a general improvement in the art.

With the above and other objects and advantages in view the invention consists in the details of construction to be hereinafter more fully described and claimed and illustrated in the accompanying drawings, in which:

Figure 1 is a side elevation of the front portion of an automobile having my device applied, a portion of the vehicle being broken away and in section, Figure 2 is a front elevation, Figure 3 is an enlarged side elevation of one lamp showing the bracket therefor in section, Figure 4 is a vertical section through one lamp showing the mounting, Figure 5 is a detail section through one lamp and bracket showing the connection, Figure 6 is a view showing the joint construction, Figure 7 is a perspective diagram of the link, lever and shaft mechanism and Figure 8 is a side elevation partly in section showing modified means for mounting a lamp.

Referring more particuarly to the drawings the letter A designates the front portion of an automobile, B designates the front fenders, C the dash, D the instrument board and E the lamps.

In carrying out my invention I may of course provide different types of supports for the lamps but in Figures 1, 2, 3, 4, and 5 I have shown semi-circular brackets 10 provided with attaching feet 11 secured against the fenders B between the hood and the outer portions. The inner faces of the arms of these brackets are formed with partially spherical concavities 12 within which are engaged partially spherical projections 13 on the sides of the lamps, the pivotal connection being assured by the provision of bolts 14 which pass through the lamp shell, the projections 13 and the brackets which carry suitable nuts 15. On these bolts are springs 16 which engage against the heads thereof and against the inside of the lamp shell for the purpose of holding the parts firmly, yet resiliently together and preventing rattling when the parts become worn. On the underside of each lamp is secured an arm 17.

The operating means consists of a rod 18 slidable through the instrument board and dash and terminating at one end in a head or button 19. On the dash are mounted brackets 20 within which is journaled a rock shaft 21 carrying an arm 22 pivotally connected at 23 with the forward end of the plunger rod 18. The shaft 21 also carries an arm 24 pivotally connected at 25 with a depending rod 26 which is in turn pivotally connected at 27 with an angle lever 28 pivoted at 29 on a suitable bracket. The other end of this angle lever is pivotally connected at 30 with a forwardly extending rod or link 31 which is in turn pivotally connected at 32 with an arm 33 on an elongated rock shaft 34 which extends across the frame of the car in suitable bearings. On the ends of this rock shaft 34 are arms 35 with which are pivotally connected upwardly extending rods or links 36 which are connected with the rear ends of the arms 17 on the lamps. By this construction it will be seen that by moving the plunger rod 18 lengthwise the various links, levers and arms will be moved to tilt the lamps on the pivot bolts 14 so that the light from the lamp may be permitted to be projected straight ahead or in a downwardly inclined direction which will avoid glare.

In Figure 6 I have shown the preferred manner of constructing the various joints or connections between the movable elements. In this figure the numeral 37 designates any one of the movable elements which is formed with a peripheral recess 38 receiving a partially spherical projection 39 on the associated element 40. These parts are pivotally connected by a bolt 40 which carries a nut 41 bearing against a split spring washer 42 which operates to hold the parts firmly and prevents looseness under any circumstances.

Instead of mounting the lamps as above described they might be mounted as indicated in Figure 8 which shows an upstanding supporting bracket 43 formed with a socket 44 of partially spherical shape leading into a bore 45. Depending from the lamp is a stem 46 carrying a ball head 47 fitting within the socket 44 and engaged by a coil spring 48 in the recess or bore. It may also be preferable to provide a transverse pin or bolt 49 passing through the ball head for preventing the lamp from moving laterally. Regardless of which lamp mounting is used the operation is the same in every instance.

From the foregoing description and a study of the drawings it is apparent that I have thus provided a simply constructed and easily installed control device which is manually operable for controlling the position of the headlamps of an automobile so that they may throw their light straight ahead or downwardly to avoid blinding drivers of approaching vehicles or any other persons approaching along a high way. Owing to the simplicity of the construction it is apparent that there is very little to get out of order so that the device should have a long life.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A headlamp mounting comprising a semicircular bracket equipped with an attaching foot and having the inner faces of the ends of its arms formed with concavities of partially spherical form, a lamp within the bracket formed at opposite sides with partially spherical projections fitting within said concavities, pivot bolts passing through the lamp, the projection and the bracket, and spring means carried by the bolt for holding the parts frictionally together.

In testimony whereof I affix my signature.

JAMES VIRGIL BARKER.